(12) United States Patent
Wong et al.

(10) Patent No.: US 12,505,924 B2
(45) Date of Patent: Dec. 23, 2025

(54) SYSTEMS AND METHODS FOR PROVIDING MEDICAL STUDIES

(71) Applicant: Change Healthcare Holdings, LLC, Nashville, TN (US)

(72) Inventors: Eldon A. Wong, Vancouver (CA); Gheorghe Cristian Bonciu, Coquitlam (CA); Fenny Thomas, Burnaby (CA); Geoff Murray, Richmond (CA); Paul van Hulsen, Vancouver (CA); Yong Leonardo Xiao, Richmond (CA); Paul Sik Leung Shum, Vancouver (CA)

(73) Assignee: Change Healthcare Holdings, LLC, Nashville, TN (US)

( * ) Notice: Subject to any disclaimer, the term of this patent is extended or adjusted under 35 U.S.C. 154(b) by 0 days.

(21) Appl. No.: 17/464,263

(22) Filed: Sep. 1, 2021

(65) Prior Publication Data

US 2023/0064998 A1    Mar. 2, 2023

(51) Int. Cl.
*H04L 67/10* (2022.01)
*G16H 30/20* (2018.01)
*G16H 40/67* (2018.01)
*H04L 67/12* (2022.01)

(52) U.S. Cl.
CPC ............. *G16H 40/67* (2018.01); *G16H 30/20* (2018.01); *H04L 67/10* (2013.01); *H04L 67/12* (2013.01)

(58) Field of Classification Search
CPC ........ G16H 40/67; G16H 30/20; H04L 67/10; H04L 67/12
See application file for complete search history.

(56) References Cited

U.S. PATENT DOCUMENTS

| 5,909,238 A | * | 6/1999 | Nagashima | H04N 7/17309 375/E7.277 |
| 2014/0140637 A1 | | 5/2014 | Rachev et al. | |
| 2015/0074181 A1 | * | 3/2015 | Taerum | H04L 67/327 709/203 |
| 2020/0285770 A1 | * | 9/2020 | Brannon | G06F 21/6245 |
| 2021/0174941 A1 | | 6/2021 | Mathur et al. | |
| 2021/0382808 A1 | * | 12/2021 | Zhang | G06F 11/3006 |
| 2022/0058723 A1 | * | 2/2022 | Swett | G06Q 20/3276 |

OTHER PUBLICATIONS

GB Search Report from GB2207445.4 mailed Oct. 31, 2022.

* cited by examiner

*Primary Examiner* — Hua Fan
(74) *Attorney, Agent, or Firm* — MARSHALL, GERSTEIN & BORUN LLP

(57) ABSTRACT

In order to improve the transfer of studies to a viewing application through a network, a cloud-based system is provided that optimizes the performance of imaging workflows. A client side application receives requests from an image viewing application. If the study is stored locally, the study including objects, are provided to the viewing application locally. Otherwise, the request is provided to the cloud-based system. The cloud-based system may include two processing components, an aggregator, and a retriever. The aggregator may collect the metadata about the study and may provide the metadata to the viewing application. The aggregator receives request for objects (e.g. images) from the viewing application and may priority the retrieval and processing of the requests based on information about the object such as its type, importance, and the metadata associated with the study.

20 Claims, 4 Drawing Sheets

SYSTEMS AND METHODS FOR PROVIDING MEDICAL STUDIES

BACKGROUND

A general trend in computing is to move the storage of documents, including images, to the cloud environment. When a user desires to view one of their images on their device, the images must first be transferred to the user's device where they can be rendered and displayed. While there is latency associated with the transfer of these images, for most use cases such latency is either unnoticeable or acceptable.

However, in the context of medical imaging, a medical study may include hundreds or thousands of high resolution images. For example, a typical Computer Tomography (CT) scan is composed of multiple series, between five and ten, each containing hundreds of images. It is not uncommon to have 3,000+ images in a study for a total of 600+ megabytes. Even with today's high bandwidth internet connections, viewing a study online may lead to a poor user experience.

Thus, what is needed are improved systems and methods for transmitting images, and more specifically medical images, over a network.

SUMMARY

In order to improve the transfer of studies to a viewing application through a network, a cloud-based system is provided that optimizes the performance of imaging workflows. A client side application receives requests from an image viewing application. If the study is stored locally, the study including objects, is provided to the viewing application locally. Otherwise, the request is provided to the cloud-based system. The cloud-based system may include two processing components, an aggregator, and a retriever. The aggregator may collect the metadata about the study and may provide the metadata to the viewing application. The retriever receives request for objects (e.g. images) from the viewing application and may prioritize the retrieval and processing of the requests based on information about the object such as its type, importance, and the metadata associated with the study. High priority objects may be routed to a high cost/performance path of the cloud-based system. Low priority object may be routed to a low cost/performance path of the cloud-based system.

In an embodiment, a method is provided. The method includes: receiving a request to open a study from a viewing application by a computing system, wherein the study comprises a plurality of objects and metadata; in response to the request, retrieving the metadata associated with the study by the computing system; transmitting the metadata to the viewing application by the computing system; receiving a plurality of requests for an object of the plurality of objects of the study by the computing system from the viewing application; for each request of the plurality of requests for an object, determining a processing path of a plurality of processing paths for the request for an object by the computing system; processing each request for an object according to the determined processing path by the computing system; and transmitting the objects corresponding to the processed requests to the viewing application by the computing system.

Embodiments may include some or all of the following features. The study may include a medical study. The plurality of objects may include one or more of image objects, GSPS objects, and report objects. The image object may include a DICOM image object. Each processing path of the plurality of processing paths may be associated with one or more of a cost and a performance level. Each processing path of the plurality of processing paths may be a different cloud-based processing path. A priority may be determined for each request of the plurality of requests for an object. Determining the priority for a request for an object may be based on one or or more of a type of the object, the metadata, and processing capabilities associated with the viewing application. The method may further include determining the processing path of the plurality of processing paths for the request for an object based on the priority of the request.

In an embodiment, a system is provided. The system includes: at least one computing device; and a computer-readable medium storing computer executable instructions that when executed by the at least one computing device cause the at least one computing device to: receive a request to open a study from a viewing application, wherein the study comprises a plurality of objects and metadata; in response to the request, retrieve the metadata associated with the study; transmit the metadata to the viewing application; receive a plurality of requests for an object of the plurality of objects of the study from the viewing application; for each request of the plurality of requests for an object, determine a processing path of a plurality of processing paths for the request for an object; process each request for an object according to the determined processing path; and transmit the objects corresponding to the processed requests to the viewing application.

Embodiments may include some or all of the following features. The study may include a medical study. The plurality of objects may include one or more of image objects, GSPS objects, and report objects. The image object may include a DICOM image object. Each processing path of the plurality of processing paths may be associated with one or more of a cost and a performance level. Each processing path of the plurality of processing paths may be a different cloud-based processing path. Determining a priority for a request for an object is based on one or ore more of a type of the object, the metadata, and processing capabilities associated with the viewing application. The system may further determine the processing path of the plurality of processing paths for the request for an object based on the priority of the request.

In an embodiment, a method is provided. The method includes: receiving a request to open a medical study from a viewing application by a computing system, wherein the study comprises a plurality of objects and metadata; in response to the request, retrieving the metadata associated with the medical study by the computing system; transmitting the metadata to the viewing application by the computing system; receiving a plurality of requests for an object of the plurality of objects of the study by the computing system from the viewing application; for each request of the plurality of requests for an object, determining a priority for the request for an object by the computing system; for each request of the plurality of requests for an object, determining a processing path of a plurality of processing paths for the request for an object based on the determined priority by the computing system; processing each request for an object according to the determined processing path by the computing system; and transmitting the objects corresponding to the processed requests to the viewing application by the computing system.

Embodiments may include some or all of the following features. The plurality of objects may include one or more of image objects, GSPS objects, and report objects. The image object may include a DICOM image object. Each processing path of the plurality of processing paths may be associated with one or more of a cost and a performance level. Each processing path of the plurality of processing paths may be a different cloud-based processing path. A priority may be determined for each request of the plurality of requests for an object. Determining the priority for a request for an object may be based on one or more of a type of the object, the metadata, and processing capabilities associated with the viewing application. The method may further include determining the processing path of the plurality of processing paths for the request for an object based on the priority of the request.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate an image transmission system and method. Together with the description, the figures further serve to explain the principles of the study transmission system and method described herein and thereby enable a person skilled in the pertinent art to make and use the study transmission system and method system and method.

DETAILED DESCRIPTION

Figure 1:
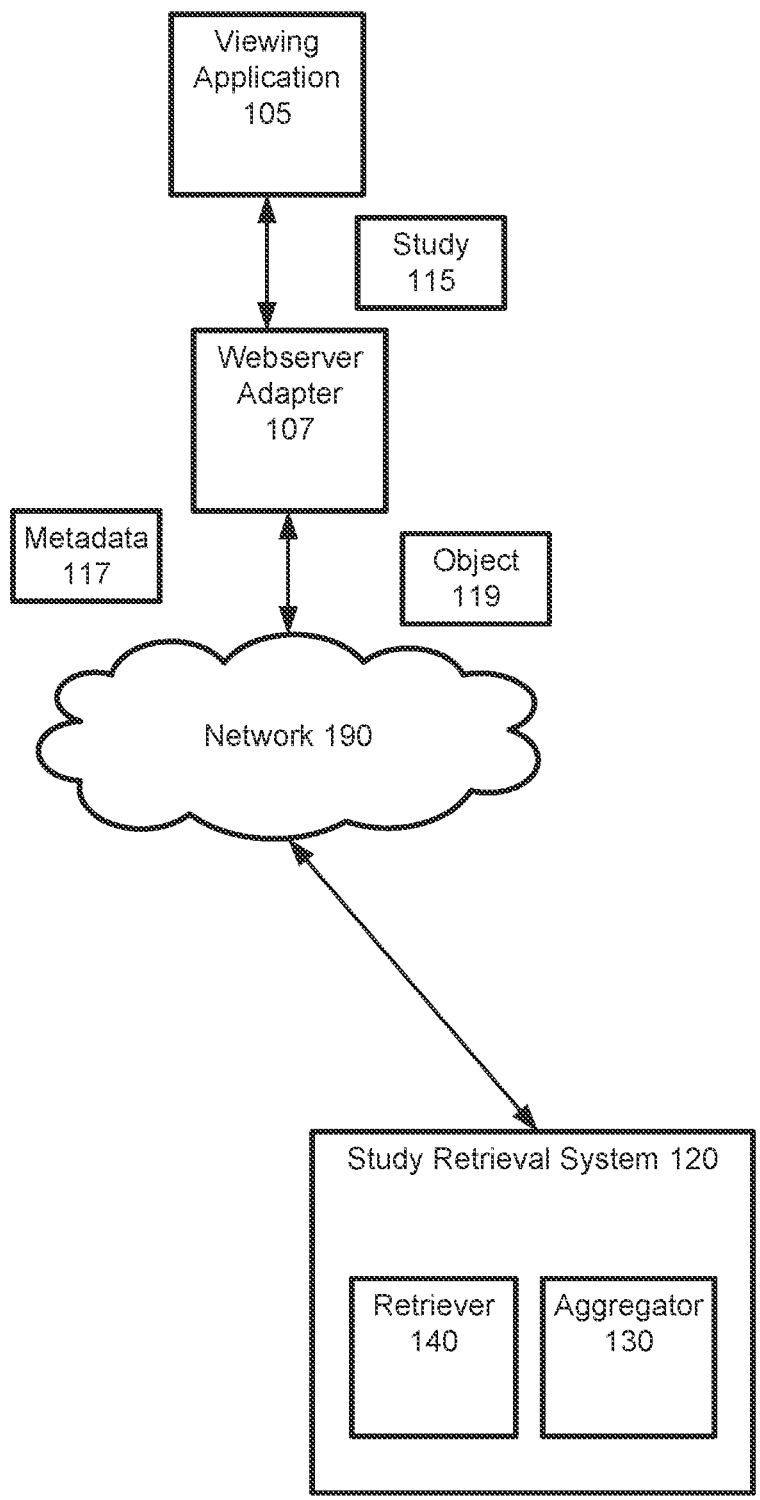
FIG. 1 is an example environment for transmitting studies to viewing applications.

FIG. 1 is an example environment for transmitting studies to viewing applications. As shown, the environment 100 includes a viewing application 105 in communication with a study retrieval system 120 through a network 190. The network 190 may include a combination of private and public networks (e.g., the internet). The study retrieval system 120, and the viewing application 105 may each be executed by one or more general purpose computing devices such as the computing system 400 illustrated with respect to FIG. 4.

The viewing application 105 may be an application used to view and interact with one or more image studies 115. The image studies 115 may be medical studies and each may include metadata 117 and a plurality of objects 119. The metadata 117 may include information about the study 115 such as the order of objects 119 in the study 115, and the last objects in the study 115 that were viewed by a user or operator of the viewing application 105. Other information may be included in the metadata 117.

The objects 119 of the viewing study 115 may include a variety of object types such as image objects, report objects, and Grayscale Softcopy Presentation State ("GSPS") objects. Other types of objects may be included such as presentation information (e.g., annotations, styles, flagged images/frames), teaching files, relevant academic/references scans, documents, and any other information that may be linked to the aforementioned entities.

With respect to image objects, these may include a variety of medical images and DICOM image objects including X-ray images, CT scan images, and MRI images. Other types of images may be included. Typically, each study 115 may include a variety of views and each view may be associated with multiple image objects. In addition, the image objects may include thumbnail images that are of a lower resolution than the image that they represent.

Due to the size of medical studies 115, rather than store the studies 115 locally at or near the computing device that executes the viewing application 105, the studies 115 (and associated objects 119 and metadata 117) may be stored on one or more remote servers. Some or all of these remote servers may be implemented together or separately using a cloud-computing environment.

One drawback associated with storing studies 115 remotely is that due to the large size of such studies, even with high speed Internet connections, users or operators of viewing applications 105 may experience latency when viewing studies 115. This latency may cause image objects 119 to load slowly especially when changing views. Such latency will result in diminished study 115 experience for users of the viewing applications 105, especially when compared with a traditional local-storage based viewing applications 105.

Accordingly, to improve the performance of image viewing applications 105, the environment 100 includes the study retrieval system 120. As shown, the study retrieval system 120 includes two components including an aggregator 130 and a retriever 140. More or fewer components may be supported. The study retrieval system 120 may prioritize the processing (e.g., retrieval and transmission) of one or more object 119 requests received from the viewing application 105. This may help reduce the appearance of latency to the user of the viewing application 105.

On the client side, there may be a webserver adapter 107, that is installed between the viewing application 105 and the network 190. The webserver adapter 107 may be installed on a same computing device as the viewing application 105 (e.g., the computing system 400), or may be installed on a different computing device. Depending on the embodiment, the webserver adapter 107 may receive requests for a study 115 from a single viewing application 105 or may receive requests from multiple viewing applications 105.

The webserver adapter 107, when receiving a request for a study 115, may first determine if there is a local copy of the study 115 that is available to provide to the viewing application 105. For example, the webserver adapter 107 may keep some number of studies 115 in a cache or other local storage. These may be studies 115 that were recently created or that were recently used by a viewing application 105. If a local copy of study 115 is available, the webserver adapter 107 may provide the study 115 and/or may fulfill requests for objects 119 related to the study 115 from the stored local copy.

If the local copy of the study 115 is not available, the webserver adapter 107 may send the request for the study to the study retrieval system 120 through the network 190. Upon receipt of the request, the aggregator 130 may begin collecting the metadata 117 associated with the study 115. Depending on the embodiment the metadata 117 may be spread across multiple servers or cloud locations. After retrieving the metadata 117, the the aggregator 130 may provide or transmit the metadata 117 to the webserver adapter 107, which may provide the metadata 117 to the viewing application 105.

The viewing application 105 may begin requesting objects 119 for the study 115 from the webserver adapter 107 according to the metadata 117. For example, the metadata 117 may indicate an order that the objects 119 are displayed in the study 115 by the viewing application 105 and may request the objects 119 according to the order. In another example, the user of the viewing application 105 may select a particular view in the study 115, and the viewing application 105 may request the objects 119 that are associated with the view according to the metadata 117. The webserver adapter 107 may transmit the requests for objects 119 to the study retrieval system 120 through the network 190.

The retriever 130 may receive a request for an object 119 and may retrieve the requested object 119 from a server or cloud-environment where the object 119 is stored. The retriever 130 may then transmit the object 119 to the webserver adapter 107 through the network 109, which may then provide the object 119 to the viewing application 105. Depending on the embodiment, the webserver adapter 107 may store the received object 119 in the cache or local storage after providing it to the viewing application 105.

The retriever 130 may control the order with which the requests for objects 119 are processed based on a variety of factors. In one embodiment, the retriever 130 may consider the processing or networking capabilities associated with the viewing application 105 when processing requests. For example, if the computing system executing the viewing application 105 has low processing capabilities—meaning that the viewing application 105 will not be able to render the objects 119 quickly—then the retriever 130 may limit the number of requests that are processed at a given time for the application 105. In contrast, when the computing system executing the viewing application 105 is known to have high processing capabilities, the retriever 140 may quickly process the object 119 requests. Depending on the embodiment, the webserver adapter 107 may periodically transmit the network and processing resources that are available to the computing system executing the viewing application 105.

The retriever 140 may assign priorities to the requests for objects 119 and may process the requests according to the assigned priorities. The priorities may be based on the processing and/or networking resources available to the viewing application 105. Viewing applications 105 with high available resources may be assigned a high priority and viewing applications with low available resources may be assigned a low priority.

The priorities for requests may be based on the associated object 119 type. For example, requests for sequencing type objects 119 may receive the highest priority 119, followed by image type objects 119, and report type objects 119. Depending on the embodiment, the relative priorities among the object 119 types may depend on the particular study 115. For example, for a study 115 that is primarily focused on reporting, requests for report objects 119 may be assigned a higher priority than requests for image objects 119 for that study 115. As another example, for a study 119 that primarily involves viewing images, requests for image objects 119 and GSPS objects 119 may be assigned a higher priority than requests for report objects 119. The focus or use of the study 115 may be determined by the retriever 140 based on the metadata 117, for example.

The priorities for requests may also be based on the size of the requested object 119. For example, requests for objects 119 such as images that are large (e.g., greater than one GB) may be assigned priorities that are higher than requests for objects 119 that are small.

In some embodiments, the retriever 140 may consider some combination of object 119 type, object 119 size, viewing application resources, and other attributes when assigning priorities to object 119 requests. The relative weight given to each attribute may be set by a user or administrator.

The retriever 140 may further process the requests for objects 119 based on their associated priority. For example, the retriever 140 may process requests in priority order such that requests for objects 119 having high priority are processed before requests for objects 119 having low priority.

In some embodiments, the retriever 140 may select a processing path for a request for an object 119 and may process the request using the selected processing path. As used herein, a processing path may refer to a processing component of one or more cloud-computing environment. As may be appreciated, to provide different levels of quality of service, cloud environments may provide different processing paths that each are associated with different levels of allotted processing resources. In addition, each processing path may be associated with a proportional cost such that entities are charged a higher cost for processing paths associated with high levels of processing resources and are charged a lower cost for paths associated with lower levels of processing resources. This ensures that cloud-resources are used in way that allows high-priority jobs to be completed quickly and allows lower priority jobs to be completed in a cost effective manner.

The retriever 130 may further allocate/reserve (and also revert) dedicated bandwidth/resources (aka processing path) for a single and/or a group of viewing applications, webserver adapters, users, and/or any other on-premises entities. This may be based on aforementioned priority characteristics, configurations, and/or a customer or entity's service tiers or agreements, for example.

Accordingly, to take advantage of the different costs and speeds associated with different processing paths, the retriever 140 may select a processing path for a request for an object 119 based on the assigned priority. A request for an object 119 with a high priority (e.g., a request for a larger image object 119) may be assigned to a processing path having a high associated cost and a high associated performance to guarantee that the object 119 is retrieved quickly and can be timely provided to the viewing application 105. Similarly, a request for an object 119 with a low priority (e.g., requests for GSPS objects 119 that are frequently requested but are not essential to the viewing application 105) may be assigned to a processing path having a low associated cost and low associated performance. Depending on the embodiment, most requests for objects 119 (e.g., request having neither a high or low priority, or having an unknown priority) may be assigned to a medium or average cost and performance associated processing path.

After processing has been completed, the retriever 140 may provide the object 119 to the webserver adapter 107, which may store the object 119 and may provide the object 119 to the viewing application 105. Alternatively, as part of the processing of the request for the object 119 in the selected processing path, the cloud-computing environment may provide the object 119 directly to the webserver adapter 107 and/or the viewing application 105.

Figure 2:
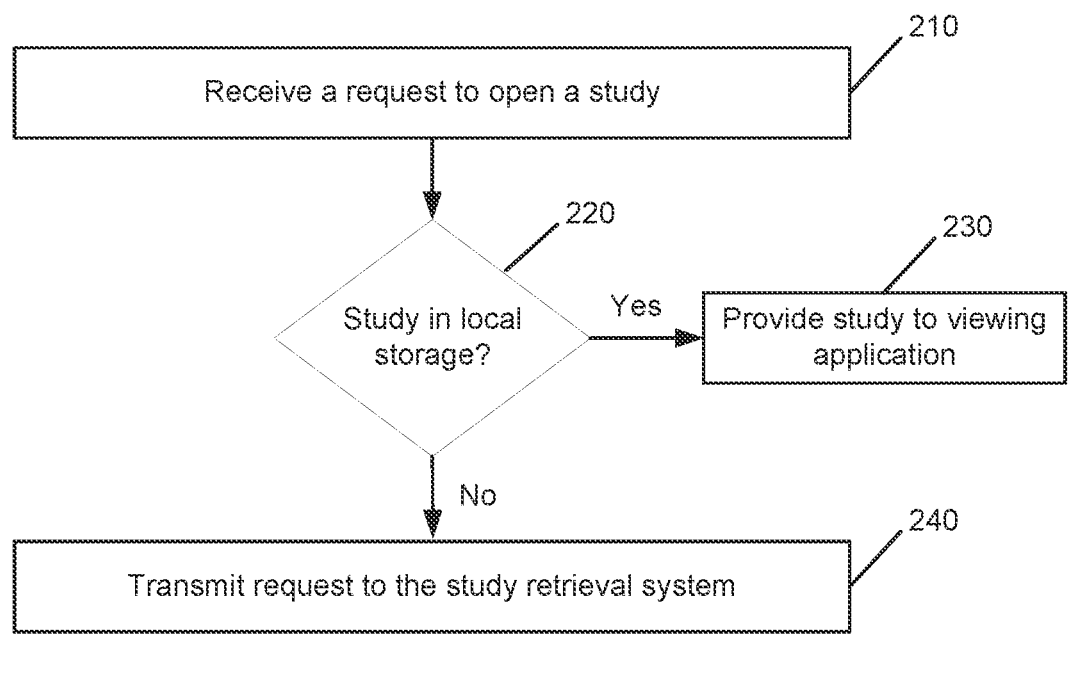
FIG. 2 is an illustration of an example method for handling requests for studies by a webserver adapter.

FIG. 2 is an illustration of an example method 200 for handling requests for studies by a webserver adapter. The method 200 may be implemented by the webserver adapter 107 of the study retrieval system 120.

At 210, a request to open a study is received. The request to open a study 115 may be received by the webserver adapter 107 from the viewing application 105. The viewing application 105 may be a medical viewing application 105 and the study 115 may be a medical image study 115. Other types of studies 115 and viewing applications 105 may be supported.

At 220, whether the requested study is in local storage is determined. Whether the requested study 115 is in local storage may be determined by the webserver adapter 107. The webserver adapter 107 may have a cache or other local storage where most recently or most frequently accessed studies 115 are stored. If the requested study 115 is in the local storage then the method 200 may continue at 230. Else, the method 200 may continue at 240.

At 230, the study is provided to the viewing application. The study 115 may be provided to the viewing application 105 by the webserver adapter 107. The viewing application 105 may then render and display the study 115 to a user of the viewing application 105.

At 240, the request is transmitted to the study retrieval system 120. The request for a study 115 may be provided to the study retrieval system 120 by the webserver adapter 107 through the network 190.

Figure 3:
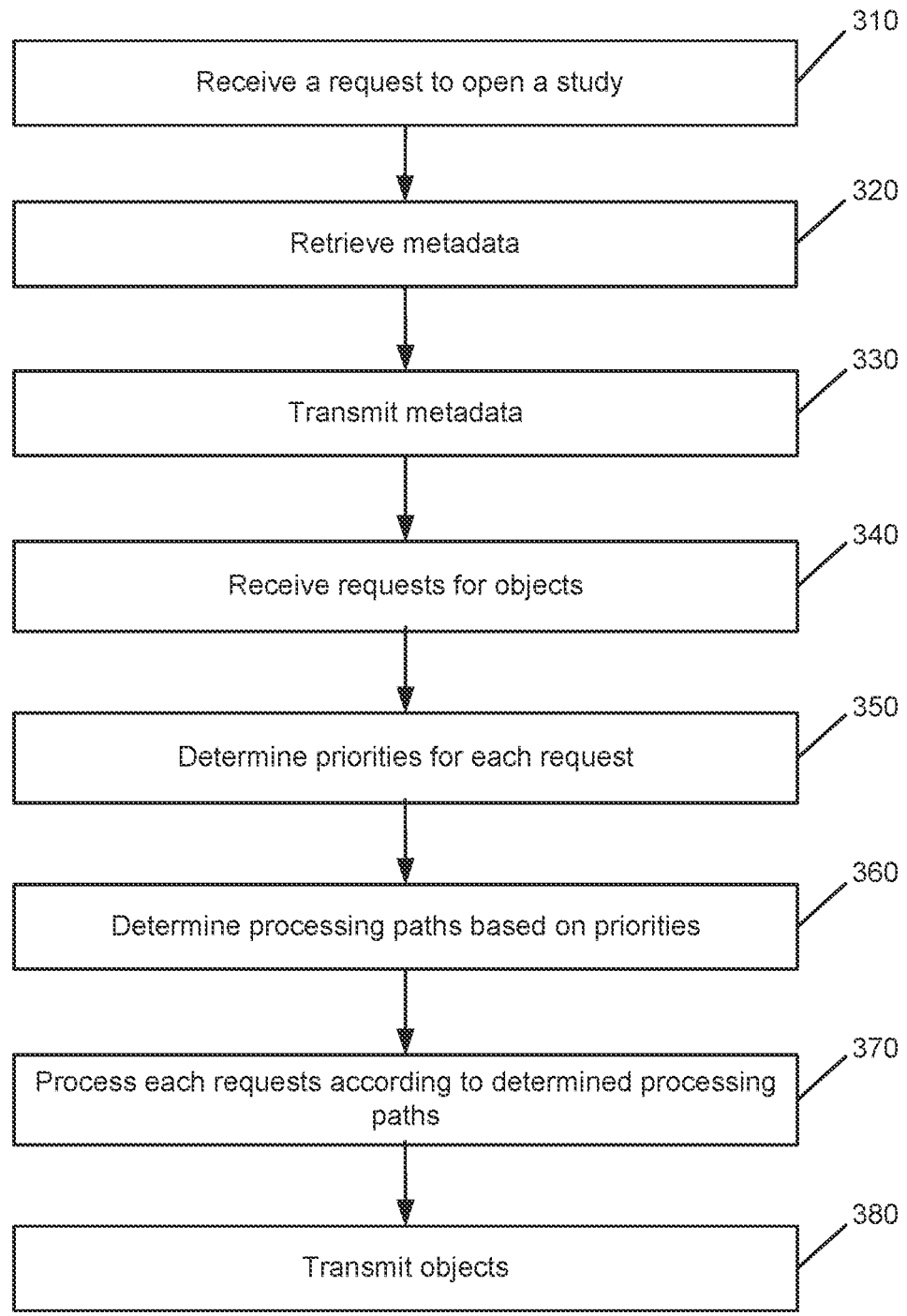
FIG. 3 is an illustration of an example method handling requests for studies by a study retrieval system.

FIG. 3 is an illustration of an example method handling requests for studies by a study retrieval system. The method 300 may be implemented by the study retrieval system 120.

At 310, a request to open a study is received. The request to open a study may be received by the study retrieval system 120 from the webserver adapter 107 through the network 190. The study 115 may be a study where no local copy is available to the webserver adapter 107.

At 320, metadata associated with the study 115 is retrieved. The metadata 117 may be retrieved by the aggregator 130 of the study retrieval system 120 from one or more cloud-based computing environments where the requested study 115 is stored. The metadata 117 may include information about the study 115 such as identifiers of the objects 119 in the study 115 and the order in which the objects 119 appear in the study 115.

At 330, the metadata is transmitted. The metadata 117 may be transmitted by the aggregator 130 to the webserver adapter 107 through the network 190.

At 340, requests for objects are received. The requests for objects 119 may be received by the retriever 140 of the study retrieval system 120. The requests for objects 119 may have been generated by the viewing application 105 based on the metadata 117 and/or user interactions, and may have been transmitted to the retriever 140 by the webserver adapter 107.

At 350, a priority is determined for each request. The priority for a request for an object 119 may be determined by the retriever 140 based on a variety of information about the requested object 119 and/or the study 115 including the type of the requested object 119, the size of the requested object 119, and the focus of the study 115. In addition, the computational and networking resources available to the webserver adapter 107 may also be considered when determining the priority of a request.

At 360, processing paths are determined for each request. The processing path for a request for an object 119 may be determined by the retriever 140 based on the priority determined for the request for the object 119. Depending on the embodiment, each processing path may be associated with a different set of processing or networking resources made available by the cloud-computing environment. In some embodiments, each path may be associated with a different cost and quality of service.

At 370, each request is processed according to its determined processing path. Each request may be processed by the retriever 140 providing the request to the cloud-computing environment for processing according to its determined processing path.

At 380, the objects 119 are transmitted. The retrieved objects 119 are transmitted to the webserver adapter 107 by the retriever 140 through the network 190.

Figure 4:
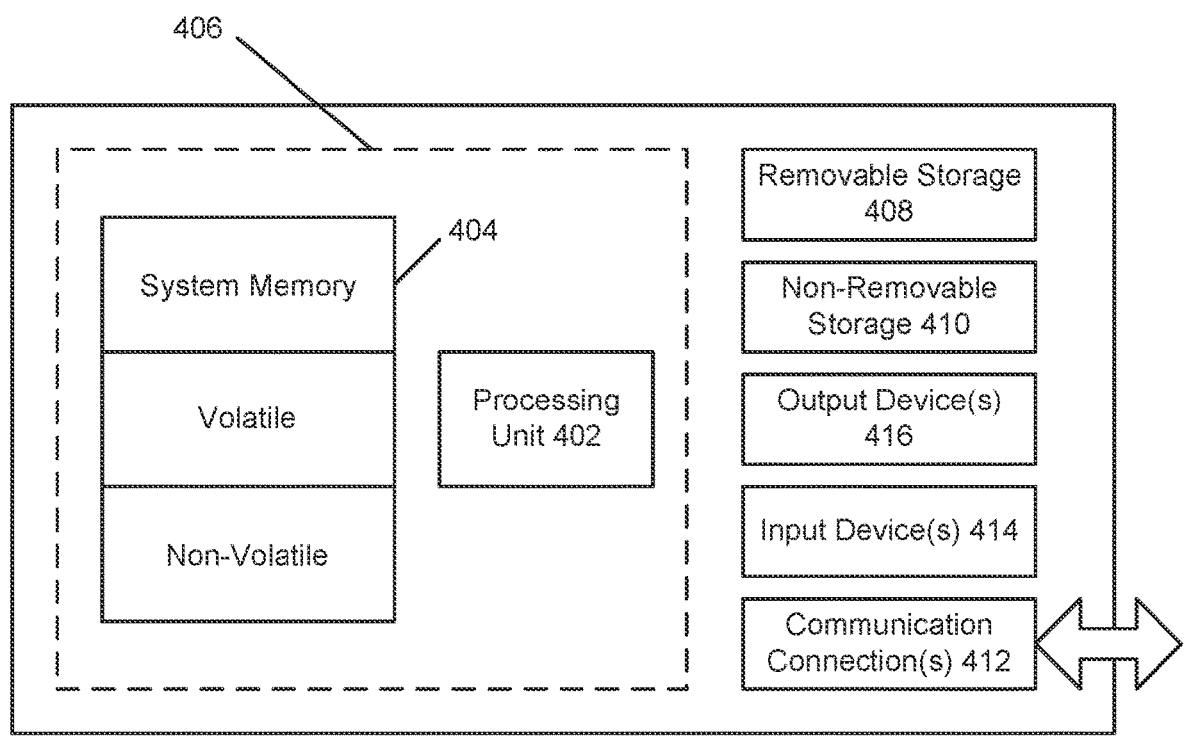
FIG. 4 shows an exemplary computing environment in which example embodiments and aspects may be implemented.

FIG. 4 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by the device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, by one or more processors of a first computing device, from a webserver adapter executing on a second computing device, a request to open a study, the request being generated by a viewing application executing on the second computing device or executing on a third computing device, wherein the study comprises a plurality of objects and metadata;
    in response to the request, receiving, by the one or more processors, the metadata associated with the study;
    transmitting, by the one or more processors, the metadata to the webserver adapter, causing the webserver adapter to provide the metadata to the viewing application;
    after transmitting the metadata to the webserver adapter, receiving, by the one or more processors and from the webserver adapter, a plurality of requests generated by the viewing application, wherein each request of the plurality of requests is associated with an object of the plurality of objects of the study, and wherein the plurality of requests were generated by the viewing application based on the metadata;
    receiving, by the one or more processors and from the webserver adapter, information regarding processing resources available to the viewing application, wherein the webserver adapter periodically transmits the information regarding the processing resources to the one or more processors;
    for each request of the plurality of requests, assigning, by the one or more processors, based on the object associated with the request, the information regarding the processing resources available to the viewing application, and the metadata associated with the study, a respective priority that represents an order in which each request of the plurality of requests is processed before or after other requests of the plurality of requests by the one or more processors;
    for each request of the plurality of requests, selecting, by the one or more processors, a processing path of a plurality of processing paths for the request based on the priority assigned to the request, a cost associated with each processing path of the plurality of processing paths, and a performance associated with each processing path of the plurality of processing paths;
    processing, by the one or more processors, each request of the plurality of requests for the respective object according to the selected processing path; and
    transmitting, by the one or more processors, the objects corresponding to the processed requests to the webserver adapter, causing the webserver adapter to (1) store the objects in a cache and (2) send the objects to the viewing application.

2. The method of claim 1, wherein the cost associated with a processing path is the cost charged for processing a request using the processing path and each processing path of the plurality of processing paths is associated with a different cost.

3. The method of claim 1, wherein the plurality of objects comprises one or more of image objects, GSPS objects, and report objects.

4. The method of claim 3, wherein the image objects comprise a DICOM image object.

5. The method of claim 1, wherein each processing path of the plurality of processing paths is associated with a performance level.

6. The method of claim 1, wherein the plurality of processing paths are associated with a cloud-computing environment, and processing each request of the plurality of requests for the respective object according to the selected processing path comprises providing each request of the plurality of requests for the respective object to the cloud-computing environment for processing according to its selected processing path.

7. The method of claim 1, wherein assigning the priority for a request for an object is based on one or more of a type of the object, the metadata, and processing capabilities associated with the viewing application.

8. The method of claim 1, further comprising receiving, by the one or more processors, information regarding networking resources available to the viewing application.

9. The method of claim 1, wherein the webserver adapter determines that the study is not in the cache before sending the request to open the study to the one or more processors.

10. The method of claim 1, further comprising:
determining, by the one or more processors and from the metadata, a focus or use of the study,
wherein the respective priority is further based on the determining.

11. A system comprising:
one or more processors of a first computing device; and
one or more computer-readable media storing processor-executable instructions that, when executed by the one or more processors, cause the one or more processors to perform operations comprising:
receiving, from a webserver adapter executing on a second computing device, a request to open a study, the request being generated by a viewing application executing on the second computing device or executing on a third computing device, wherein the study comprises a plurality of objects and metadata;
in response to the request, receiving the metadata associated with the study;
transmitting the metadata to the webserver adapter, causing the webserver adapter to provide the metadata to the viewing application;
after transmitting the metadata to the webserver adapter, receiving a plurality of requests generated by the viewing application from the webserver adapter, wherein each request of the plurality of requests is associated with an object of the plurality of objects of the study, and wherein the plurality of requests were generated by the viewing application based on the metadata;
receiving, from the webserver adapter, information regarding processing resources available to the viewing application, wherein the webserver adapter and periodically transmits the information regarding the processing resources to the one or more processors;
for each request of the plurality of requests, assigning a respective priority to the request based on the object associated with the request, the information regarding the processing resources available to the viewing application, and the metadata associated with the study, wherein the respective priority represents an order in which each request of the plurality of requests is processed before or after other requests of the plurality of requests;
for each request of the plurality of requests, selecting a processing path of a plurality of processing paths for the request based on the priority assigned to the request, a cost associated with each processing path of the plurality of processing paths, and a performance associated with each processing path of the plurality of processing paths;
processing each request of the plurality of requests for the respective object according to the selected processing path; and
transmitting the objects corresponding to the processed requests to the webserver adapter, causing the webserver adapter to (1) store the objects in a cache and (2) send the objects to the viewing application.

12. The system of claim 11, wherein the cost associated with a processing path is the cost charged for processing a request using the processing path and each processing path of the plurality of processing paths is associated with a different cost.

13. The system of claim 11, wherein the plurality of objects comprises one or more of image objects, GSPS objects, and report objects.

14. The system of claim 13, wherein the image objects comprise a DICOM image object.

15. The system of claim 11, wherein each processing path of the plurality of processing paths is associated with a performance level.

16. The system of claim 11, wherein each processing path of the plurality of processing paths is a different cloud-based processing path.

17. The system of claim 11, wherein the plurality of processing paths are associated with a cloud-computing environment, and processing each request of the plurality of requests for the respective object according to the selected processing path comprises providing each request of the plurality of requests for the respective object to the cloud-computing environment for processing according to its selected processing path.

18. The system of claim 11, wherein the one or more computer-readable media storing processor-executable instructions that, when executed by the one or more processors, further cause the one or more processors to perform operations comprising:
determining, from the metadata, a focus or use of the study, wherein the respective priority is further based on the determining.

19. One or more non-transitory computer-readable media storing processor-executable instructions that, when executed by one or more processors of a first computing device, cause the one or more processors to perform operations comprising:
receiving, from a webserver adapter executing on a second computing device, a request to open a study, the request being generated by a viewing application executing on the second computing device or executing on a third computing device, wherein the study comprises a plurality of objects and metadata;
in response to the request, receiving the metadata associated with the study;
transmitting the metadata to the webserver adapter, causing the webserver adapter to provide the metadata to the viewing application;
after transmitting the metadata to the webserver adapter, receiving a plurality of requests generated by the viewing application from the webserver adapter, wherein each request of the plurality of requests is associated with an object of the plurality of objects of the study, and wherein the plurality of requests were generated by the viewing application based on the metadata;
receiving, from the webserver adapter, information regarding processing resources available to the viewing application, wherein the webserver adapter periodically transmits the information regarding the processing resources to the one or more processors;
for each request of the plurality of requests, assigning a respective priority to the request based on the object associated with the request, the information regarding the processing resources available to the viewing application, and the metadata associated with the study, wherein the respective priority represents an order in which each request of the plurality of requests is processed before or after other requests of the plurality of requests;

for each request of the plurality of requests, selecting a processing path of a plurality of processing paths for the request based on the priority assigned to the request, a cost associated with each processing path of the plurality of processing paths, and a performance associated with each processing path of the plurality of processing paths;

processing each request of the plurality of requests for the respective object according to the selected processing path; and transmitting the objects corresponding to the processed requests to the webserver adapter, causing the webserver adapter to (1) store the objects in a cache and (2) send the objects to the viewing application.

20. The one or more non-transitory computer-readable media of claim 19, wherein the cost associated with a processing path is the cost charged for processing a request using the processing path and each processing path of the plurality of processing paths is associated with a different cost.

* * * * *